H. PRUETT.
COTTON CHOPPER.
APPLICATION FILED OCT. 15, 1912.
1,078,749.
Patented Nov. 18, 1913.
2 SHEETS—SHEET 1.
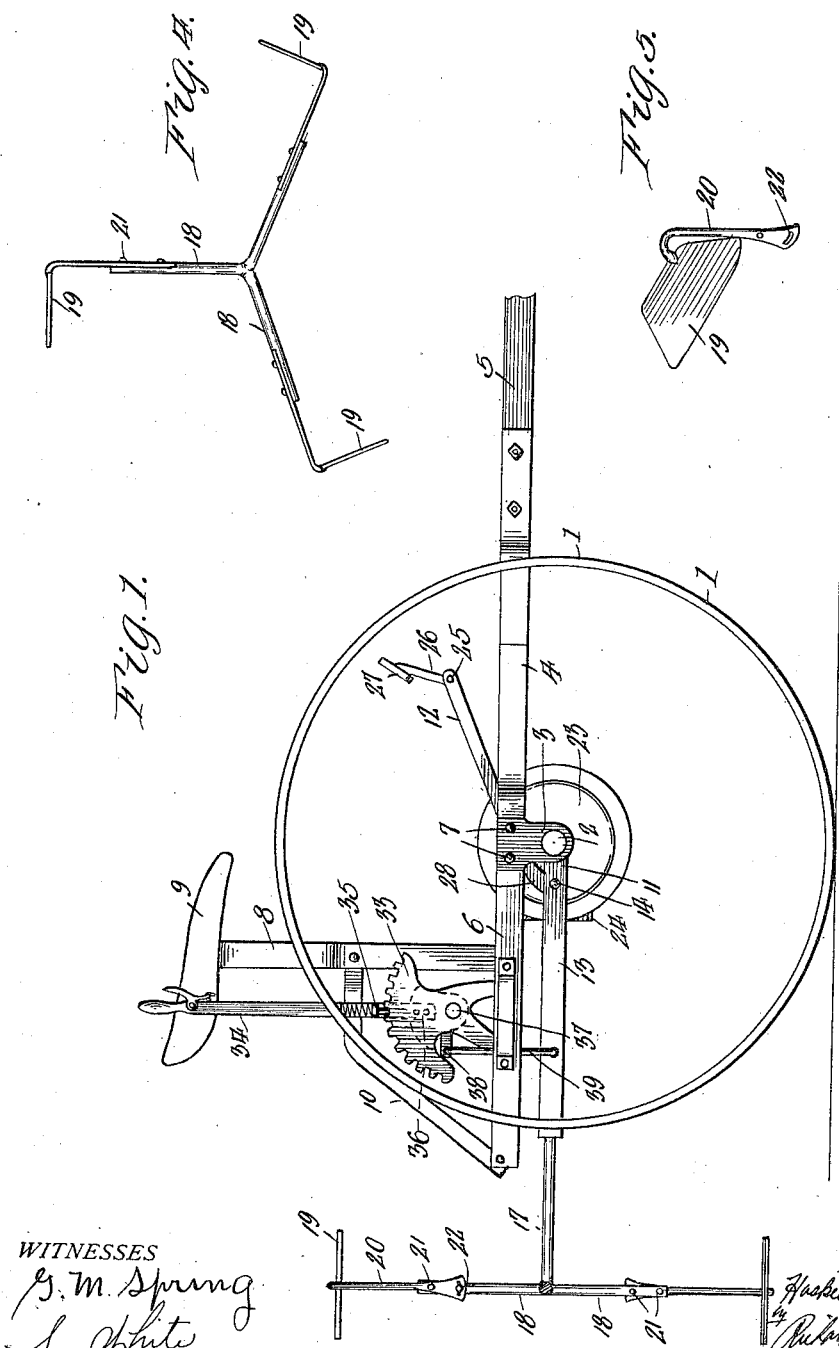
WITNESSES
INVENTOR
Haskell Pruett,
his Attorney

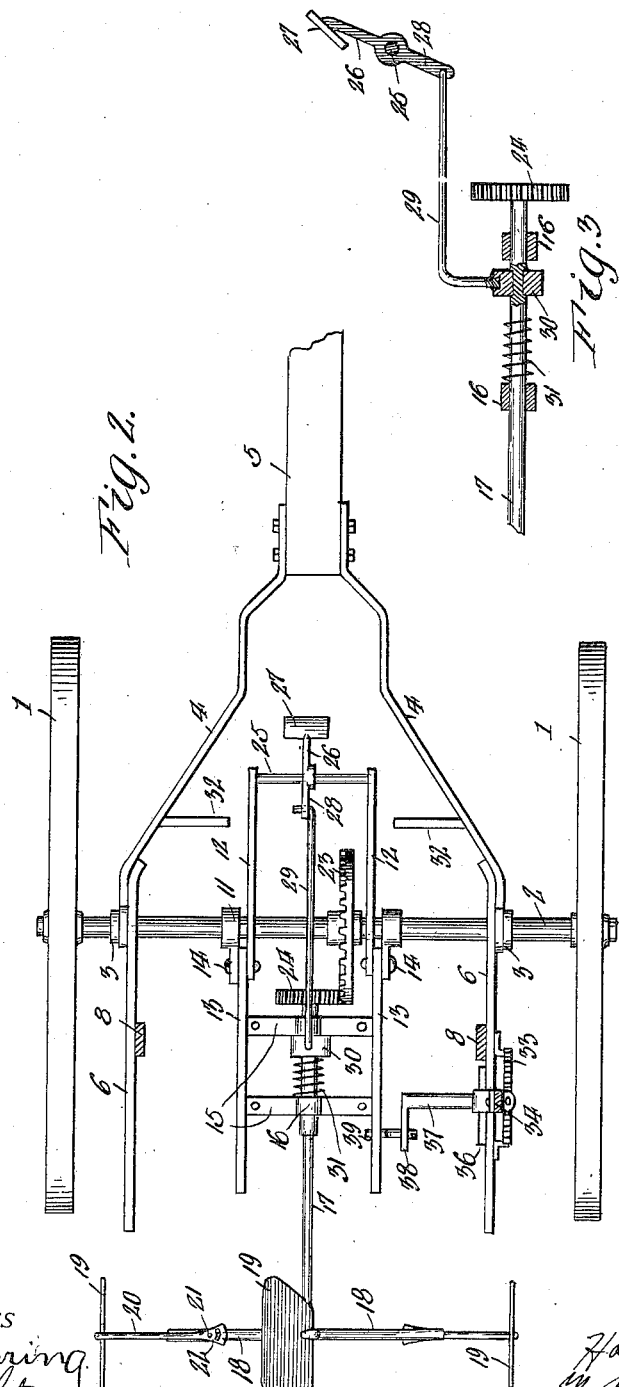

UNITED STATES PATENT OFFICE.

HASKELL PRUETT, OF REED, OKLAHOMA.

COTTON-CHOPPER.

1,078,749.

Specification of Letters Patent.

Patented Nov. 18, 1913.

Application filed October 15, 1912. Serial No. 725,854.

*To all whom it may concern:*

Be it known that I, HASKELL PRUETT, a citizen of the United States, residing at Reed, in the county of Greer and State of Oklahoma, have invented new and useful Improvements in Cotton-Choppers, of which the following is a specification.

My invention relates to cotton choppers.

The invention aims to generally improve the construction of a device of this kind and especially with regard to the driving and adjusting of the chopping means.

The preferred embodiment of my invention is hereinafter described in connection with the accompanying drawings, wherein:—

Figure 1 is a side elevation. Fig. 2 is a plan view. Fig. 3 is a detail view of the mechanism for connecting and operating the chopping means from the axle of the implement. Fig. 4 is a rear view illustrating the chopper member, and, Fig. 5 is a detail perspective view of one of the hoes carried thereby, the wheels in Fig. 1 being shown without spokes for the sake of clearness.

Referring to the drawings wherein like reference characters designate like parts throughout the several views thereof, 1 designates wheels which are supported from an axle or shaft 2. One or both of said wheels is rigidly attached to the axle so that the movement of the wheels will be imparted to the axle and thereby rotate the same. Loosely mounted upon the axle 2 are brackets 3 to which are secured forward arms or bars 4 to which is adapted to be secured a draft tongue or pole 5. Rearwardly extending arms or bars 6 are also connected to the brackets 3. Bolts 7 may be used for fastening the parts together, and said bolts may extend through the brackets and arms 4 and 6. From the bars 6 extend suitable risers 8 upon or to which a seat 9 may be secured. Braces 10 may join the risers 8 and bars 6. Brackets 11 are loosely mounted upon the shaft 2 and have secured thereto forward arms or bars 12, and rearward arms or bars 13, the bars 12 and 13 preferably being secured to the brackets 11 by means of bolts 14. The bars 13 are connected together by suitable cross bars designated 15, each of which is deflected at its center as at 16, to provide sockets or bearings in which is slidably mounted a rod 17.

Rod 17 at its outer end terminates in radiating arms 18 formed at right angles thereto. To each of said arms is secured a hoe or other chopping member 19 by means of an attaching arm 20. Bolts 21 secure the arms 20 to the arms 18 and one of said bolts passes through an arcuate slot 22 provided in the arm 20. It will be seen that by means of the arcuate slot and bolt connection, the hoes may be adjustably secured at an angle to the arms 18.

On the shaft 2 is rigidly mounted so as to be driven thereby, a gear wheel 23 having its teeth provided on one side face thereof. The slidable shaft 17 has mounted thereon, a gear wheel 24 at its inner end. The gear wheel 24 is small relatively to the gear wheel 23, and the teeth of said gear wheel 24 are provided on its periphery so that the same may be readily moved out of engagement with the gear wheel 23.

Between the bars 12 at their forward ends, and journaled or pivoted thereto, is a cross rod 25 to which is rigidly secured a pedal or foot member 26 which has a foot piece 27 extending on one side of the rod 25, and an arm 28 extending on the opposite side of the same rod. To the arm 28 is loosely secured a rod 29 which extends rearwardly and is loosely connected to a collar or block 30, mounted on the slidable rod 17 intermediate the cross bars 15. A return spring 31 is mounted on the shaft 17 intermediate the rearmost bar 15 and the collar 30, tending to force said collar and rear bars apart. It will be seen that when the gear wheels 23 and 24 are in mesh, the gear wheel 24 is spaced away from the adjacent cross bars 15 in order to permit the gear wheel 24 to slide rearwardly out of engagement with the gear wheel 23. If desired, foot rests 32 may be connected to the bars 4.

Suitable means are provided whereby the rear bars 13 may be adjusted vertically to regulate the depth of penetration of the hoes into the ground, or to entirely remove said hoes from engagement with the ground, as is desirous when going to or returning from the field. Referring to this elevating means, 33 designates a suitable toothed segment which is secured to one of the bars 6, and 34 designates a lever which has a suitable spring-pressed plunger 35 to engage the notches intermediate the teeth of the segment 33. Said lever is attached to a plate 36 which is pivotally mounted on the segment by means of a pin or short shaft 37 which is secured to the plate 36 and projects on opposite sides thereof. Shaft 37 is provided with a rearwardly extending arm 38 to which is loosely connected a rod 39, also loosely connected to one of the bars 13.

In operation, the cotton chopper member comprising the hoes and rod from which they are supported, is elevated above the ground or regulated to the desired depth of penetration through the adjustment of the lever 34 and connected plate 38, rod 39 and bars 13 and 15, in which said member is supported. It is obvious that the lever is locked in any adjusted position by means of the plunger engaging the notches between the teeth of the segment 33.

In the operation of chopping, the hoes are revolved through the medium of the gear 23 driving the gear 24 and accordingly the rod 17 from which the hoes are supported.

Should it be desired to cease operation of the chopper member, the foot piece 27 is depressed and the arm 28 raised by such action, which results in the rod 29 being shoved or moved rearwardly, and which in turn slides the shaft 17 rearwardly by means of the connection with the collar 30. During said movement, the shaft 17 of course, moves the gear wheel 24 out of mesh with the gear wheel 23. Whereupon the cotton chopper member will not be driven by the gear wheel 23. Such disengagement of the gear wheels 23 and 24 is maintained as long as the foot piece is depressed. As soon as said foot piece is released, the spring 31 returns or restores the part to normal position, as in Fig. 2, when the gear wheels 23 and 24 will be in mesh so as to drive the chopper member.

It is to be understood that the preferred embodiment of my invention only, has been herein described and that changes in the details of construction thereof may be made within the spirit and scope of the appended claims, and are hence reserved by me.

Having thus described my said invention, what I claim and desire to secure by Letters Patent is:—

1. In a device of the class described, a shaft, a frame pivotally mounted on said shaft having side members, cross members, and a cross rod, a rotatable chopper having a rod, said cross members connecting said side members and slidably supporting said chopper rod, an enlargement on said chopper rod intermediate said cross members, a return spring intermediate said enlargement and one of said cross members, a gear wheel carried by said chopper rod beyond the cross members, a gear wheel on said shaft in mesh with the gear wheel on said chopper rod, a lever pivoted on said cross rod operable to disengage the gears, and a rod connected to said lever and said enlargement.

2. In a device of the class described, wheels, a rod or axle therefor having a gear wheel thereon, a main frame mounted from said axle having side bars, a second frame having side bars, cross-bars and a cross rod, brackets loosely mounted on said axle, said side bars of said second frame mounted intermediate said side bars of the main frame and fastened to said brackets, a cotton chopper member having a shaft, said shaft being slidably mounted on said cross bars, an enlargement on said chopper rod mounted intermediate said bars, a spring surrounding said chopper rod bearing against one of said bars and against said enlargement, a gear wheel on said chopper rod in mesh with said gear wheel on the axle, a lever pivoted on said cross rod, a connecting rod pivoted to said lever and connected to said enlargement, a toothed member on one of said side bars of said main frame, a lever device pivoted to said toothed member by means of an elongated pivot member, an angle arm on said pivot member, and a connecting member from one of the side bars of said second frame to said angle arm, pivoted to said angle arm.

HASKELL PRUETT.

Witnesses:
LOUCIAN H. ELKINS,
JAMES W. TUCKER.

---

Copies of this patent may be obtained for five cents each, by addressing the "Commissioner of Patents, Washington, D. C."